United States Patent [19]

Kumasaka et al.

[11] Patent Number: 4,520,141

[45] Date of Patent: May 28, 1985

[54] METHOD FOR MANUFACTURING PHENOLIC RESIN FOAM

[75] Inventors: Sadao Kumasaka; Satomi Tada, both of Tokyo, Japan

[73] Assignee: Toyo Rubber Chemical Industry Co., Ltd., Tokyo, Japan

[21] Appl. No.: 413,488

[22] Filed: Aug. 31, 1982

[30] Foreign Application Priority Data

Sep. 4, 1981 [JP] Japan ................. 56-139352

[51] Int. Cl.$^3$ ................................. C08J 9/08
[52] U.S. Cl. ................................. 521/126; 521/127; 521/128; 521/136; 521/181
[58] Field of Search ........... 521/181, 136, 128, 126, 521/127

[56] References Cited

U.S. PATENT DOCUMENTS

| 2,608,536 | 8/1952 | Sterling | 521/181 |
| 3,271,331 | 9/1966 | Ender | 521/181 |
| 3,389,094 | 6/1968 | D'Alesandro | 521/181 |
| 4,390,641 | 6/1983 | Smith | 521/103 |

Primary Examiner—Morton Foelak

Attorney, Agent, or Firm—Frishauf, Holtz, Goodmn & Woodward

[57] ABSTRACT

A method for manufacturing a phenolic resin foam is provided which comprises the steps of mixing a composition consisting of 100 parts by weight of a resol-type phenol-formaldehyde resin, 5 to 40 parts by weight of a curing agent consisting of an acid, and a foaming agent consisting of an isocyanate or a mixture thereof with water, and heating the composition for foaming, an amount of the isocyanate being 5 to 30 parts by weight if the foaming agent is the isocyanate alone, and the amount of the isocyanate being not less than its equivalent weight and an amount of water being 5 to 30 parts by weight if the foaming agent is the mixture of the isocyanate with water. If 100 parts by weight of a urethane-modified phenol-formaldehyde resin are used in place of 100 parts by weight of the resol-type phenol-formaldehyde resin, 0.1 to 1.5 parts by weight of a curing agent consisting of a tin compound are used in place of the acid curing agent. The method of the invention allows easy control of the formation of cells and improves the yield of foamed product.

18 Claims, No Drawings

METHOD FOR MANUFACTURING PHENOLIC RESIN FOAM

BACKGROUND OF THE INVENTION

The present invention relates to a method for manufacturing a phenolic resin foam.

Trichlorofluoromethane (Freon 11) is mainly used as a foaming agent in a conventional method for manufacturing a phenolic resin foam. However, since Freon 11 is highly volatile, control of the formation of cells is difficult, and there is the problem of contamination of the working environment.

SUMMARY OF THE INVENTION

It is an object of the present invention to provide a method for manufacturing a phenolic resin foam, wherein control of the formation of cells is easy, the yield of foamed product is improved and the working environment is excellent.

According to an aspect of the present invention, there is provided a method for manufacturing a phenolic resin foam, comprising the steps of mixing a composition consisting of 100 parts by weight of a resol-type phenol-formaldehyde resin, 5 to 40 parts by weight of a curing agent consisting of an acid, and a foaming agent consisting of an isocyanate or a mixture thereof with water, and heating the composition for foaming, the amount of the isocyanate being 5 to 30 parts by weight if the foaming agent is the isocyanate alone, and the amount of the isocyanate being not less than an equivalent weight thereof, and an amount of water being 5 to 30 parts by weight if the foaming agent is the mixture of the isocyanate with water.

According to another aspect of the present invention, there is also provided a method for manufacturing a phenolic resin foam, comprising the steps of mixing a composition consisting of 100 parts by weight of a urethane-modified phenol-formaldehyde resin, 0.1 to 1.5 parts by weight of a curing agent consisting of a tin compound, and a foaming agent consisting of an isocyanate or a mixture thereof with water, and heating the composition for foaming, the amount of the isocyanate being 5 to 30 parts by weight if the foaming agent is the isocyanate alone, and the amount of the isocyanate being not less than an equivalent weight thereof, and the amount of water being 5 to 30 parts by weight if the foaming agent is the mixture of the isocyanate with water.

DETAILED DESCRIPTION OF THE PREFERRED EMBODIMENTS

According to a characteristic feature of the present invention, an isocyanate or a mixture thereof with water is used as a foaming agent. Due to the use of this foaming agent, control of the formation of cells becomes extremely easy, the yield of resultant foamed product is improved, and the working environment is not contaminated. If the foaming agent is a mixture of the isocyanate with water, the isocyanate is used in the amount of its equivalent weight or more and preferably 120 to 150% of its equivalent weight. If a phenol-formaldehyde resin of resol-type is used as a phenolic resin, the curing agent is an acid such as acetic acid, hydrochloric acid, sulfuric acid, or lactic acid. On the other hand, if a urethane-modified phenol-formaldehyde resin is used as the phenolic resin, the curing agent is a tin compound such as dibutyltin dilaurate, dibutyltin di-2-ethylhexoate, stannous oleate, and stannous 2-ethylhexoate. Examples of the isocyanates which are preferably used herein may include diphenylmethane-4,4'-diisocyanate, tolylene diisocyanate, xylylene diisocyanate, naphthylene-1,5-diisocyanate, and hexamethylene diisocyanate. A foam stabilizer such as silicone oil may be added in the amount of 1 to 5 parts by weight to the composition. Other additives such as a filler or a pigment may also be added to the composition as needed.

The composition comprising the phenolic resin, the foaming agent and the curing agent is mixed, and is then injected into a mold or is supplied onto a moving conveyor. Then the composition is heated to be foamed and cured. The composition is generally heated at a temperature of about 80° to 120° C. for about 5 to 20 minutes. A phenolic resin foam manufactured by the method of the present invention as described above has uniform cells and has characteristics which are equivalent or superior to those of a conventional resin foam manufactured with Freon 11 as a foaming agent.

The present invention will now be described by way of its examples.

EXAMPLE 1

Resol-type phenol-formaldehyde resin: 100 parts by weight
Diphenylmethane-4,4'-diisocyanate (foaming agent): 5 parts by weight
Acetic acid (curing agent): 10 parts by weight The composition of the mixing ratio shown above was mixed in a mixer for 20 seconds and was immediately injected into a mold. The composition was then heated at 80° C. for 20 minutes. After interrupting heating, the composition was left to stand for 10 minutes. The mold was then released to provide a phenol resin foam.

EXAMPLE 2

Resol-type phenol-formaldehyde resin: 100 parts by weight
Diphenylmethane-4,4'-diisocyanate (foaming agent): 20 parts by weight
Acetic acid (curing agent): 10 parts by weight The composition of the mixing ratio shown above was mixed in a mixer for 20 seconds and was then foamed in the same manner as in Example 1 above except that the heating temperature was 80° C., the heating time was 25 minutes, and the time to stand was 10 minutes.

The properties of the foamed bodies manufactured in Examples 1 and 2 were measured to be as shown in Table 1 below.

TABLE 1

|  | Example 1 | Example 2 |
|---|---|---|
| Specific Gravity | 0.35 | 0.08 |
| Bending Strength (kg/cm$^2$) | 16.0 | 5.4 |
| Fire Retardancy (Oxygen Index) | 36.0 | 35 |
| Smoke Concentration (%) | 98.0 | 96.0 |
| Compression Strength (kg/cm$^2$) | 23.0 | 6.4 |
| Size Stability (%) −30° C. | −0.25 | −0.28 |
| +120° C. | −1.3 | −1.81 |

Note:
Fire retardancy and smoke concentration were measured according to JIS K 7201.

EXAMPLE 3

Urethane-modified formaldehyde resin: 100 parts by weight

Water: 5.0 parts by weight
Dibutyltin dilaurate (curing agent): 0.12 parts by weight
Silicone oil (foam stabilizer): 4.0 parts by weight
Diphenylmethane-4,4'-diisocyanate (foaming agent): 250 parts by weight The composition of the mixing ratio shown above was mixed in a mixer for 10 seconds and was immediately injected into a mold and was left to stand for 2 minutes. Thereafter, the composition together with the mold was placed in an oven at 80° C. for 5 minutes and was thereafter removed from the oven. The resultant foam was then released from the mold.

EXAMPLE 4

Resol-type phenol-formaldehyde resin: 100 parts by weight
Water: 12 parts by weight
Acetic acid (curing agent): 10 parts by weight
Silicone oil (foam stabilizer): 4.0 parts by weight
Diphenylmethane-4,4'-diisocyanate (foaming agent): 380 parts by weight The composition of the mixing ratio shown above was mixed and foamed in the same manner as in Example 3.

The properties of the foamed bodies manufactured in Examples 3 and 4 were measured to be as shown in Table 2 below.

TABLE 2

|  |  | Example 3 | Example 4 |
|---|---|---|---|
| Specific Gravity |  | 0.0288 | 0.0142 |
| Bending Strength (kg/cm$^2$) |  | 1.14 | 0.63 |
| Compression Strength (kg/cm$^2$) |  | 1.27 | 0.52 |
| Size Stability (%) | −30° C. | −0.47 | −0.13 |
|  | +120° C. | −0.65 | −0.81 |

What we claim is:

1. A method for manufacturing a phenolic resin foam, comprising the steps of mixing a composition consisting essentially of 100 parts by weight of a resol-type phenol-formaldehyde resin, 5 to 40 parts by weight of a curing agent consisting of an acid, and a foaming agent consisting of an isocyanate, and heating the composition to foam said composition and form said phenolic resin foam, the amount of the isocyanate being 5 to 30 parts by weight.

2. A method for manufacturing a phenolic resin foam, comprising the steps of mixing a composition consisting essentially of 100 parts by weight of a urethane-modified phenol-formaldehyde resin, 0.1 to 1.5 parts by weight of a curing agent consisting of a tin compound, and a foaming agent consisting of an isocyanate, and heating the composition to foam said composition and form said phenolic resin foam, the amount of the isocyanate being 5 to 30 parts by weight.

3. A method according to claim 1, wherein the acid is one member selected from the group consisting of acetic acid, hydrochloric acid, sulfuric acid, and lactic acid.

4. A method according to claim 2, wherein the tin compound is one member selected from the group consisting of dibutyltin dilaurate, dibutyltin di-2-ethylhexoate, stannous oleate, and stannous 2-ethylhexoate.

5. A method according to claim 1 or 2, wherein the isocyanate is one member selected from the group consisting of diphenylmethane-4,4'-diisocyanate, xylylene diisocyanate, tolylene diisocyanate, naphthylene-1,5-diisocyanate, and hexamethylene diisocyanate.

6. A method according to claim 1 or 2, wherein the composition further contains 1 to 5 parts by weight of a foam stabilizer.

7. A method according to claim 1 or 2, wherein the composition is injected into a mold, and is then heated for foaming.

8. A method according to claim 3, wherein the isocyanate is selected from the group consisting of diphenylmethane-4,4'-diisocyanate, xylylene diisocyanate, tolylene diisocyanate, naphthylene-1,5-diisocyanate, and hexamethylene diisocyanate.

9. A method according to claim 4, wherein the isocyanate is selected from the group consisting of diphenylmethane-4,4'-diisocyanate, xylylene diisocyanate, tolylene diisocyanate, naphthylene-1,5-diisocyanate, and hexamethylene diisocyanate.

10. A method according to claim 3, wherein the composition further contains 1 to 5 parts by weight of a foam stabilizer.

11. A method according to claim 4, wherein the composition further contains 1 to 5 parts by weight of a foam stabilizer.

12. A method according to claim 8, wherein the composition further contains 1 to 5 parts by weight of a foam stabilizer.

13. A method according to claim 9, wherein the composition further contains 1 to 5 parts by weight of a foam stabilizer.

14. A method according to claim 3, wherein the composition is injected into a mold, and is then heated for foaming.

15. A method according to claim 4, wherein the composition is injected into a mold, and is then heated for foaming.

16. A method according to claim 5, wherein the composition is injected into a mold, and is then heated for foaming.

17. A method according to claim 8, wherein the composition is injected into a mold, and is then heated for foaming.

18. A method according to claim 9, wherein the composition is injected into a mold, and is then heated for foaming.

* * * * *